United States Patent [19]
Mildner

[11] 3,783,378
[45] Jan. 1, 1974

[54] BATTERY ADAPTER

[75] Inventor: Walfrid Mildner, Verlautenheide, Germany

[73] Assignee: ERA Electronische Rechnanlagen Studiengesellschaft fur Wissenschaftliche Datenverarbeitung mbH, Verlautenheide, Germany

[22] Filed: July 31, 1972

[21] Appl. No.: 276,690

[52] U.S. Cl............................................. 324/73 R
[51] Int. Cl............................................. G01r 15/12
[58] Field of Search............................ 324/73, 51, 15

[56] References Cited
UNITED STATES PATENTS

| | | | |
|---|---|---|---|
| 3,617,870 | 11/1971 | Howes | 324/73 X |
| 3,428,888 | 2/1969 | Nolte | 324/73 R |
| 3,646,438 | 2/1972 | Staff | 324/73 R |

Primary Examiner—Alfred E. Smith
Attorney—Richard D. Mason et al.

[57] ABSTRACT

An adapter may be quickly and easily connected between a vehicle battery and the vehicle battery terminals. A digital computer may then be connected to the adapter and may monitor the vehicle electrical system. Means are provided whereby the computer may automatically insert any one of a series of measuring resistors in series with the battery current flow so as to allow a wide variety of measurements to be made with a single adapter. Means are also provided whereby the computer may shunt the measuring resistors when excessive current levels are encountered so as to protect them from destruction.

10 Claims, 1 Drawing Figure

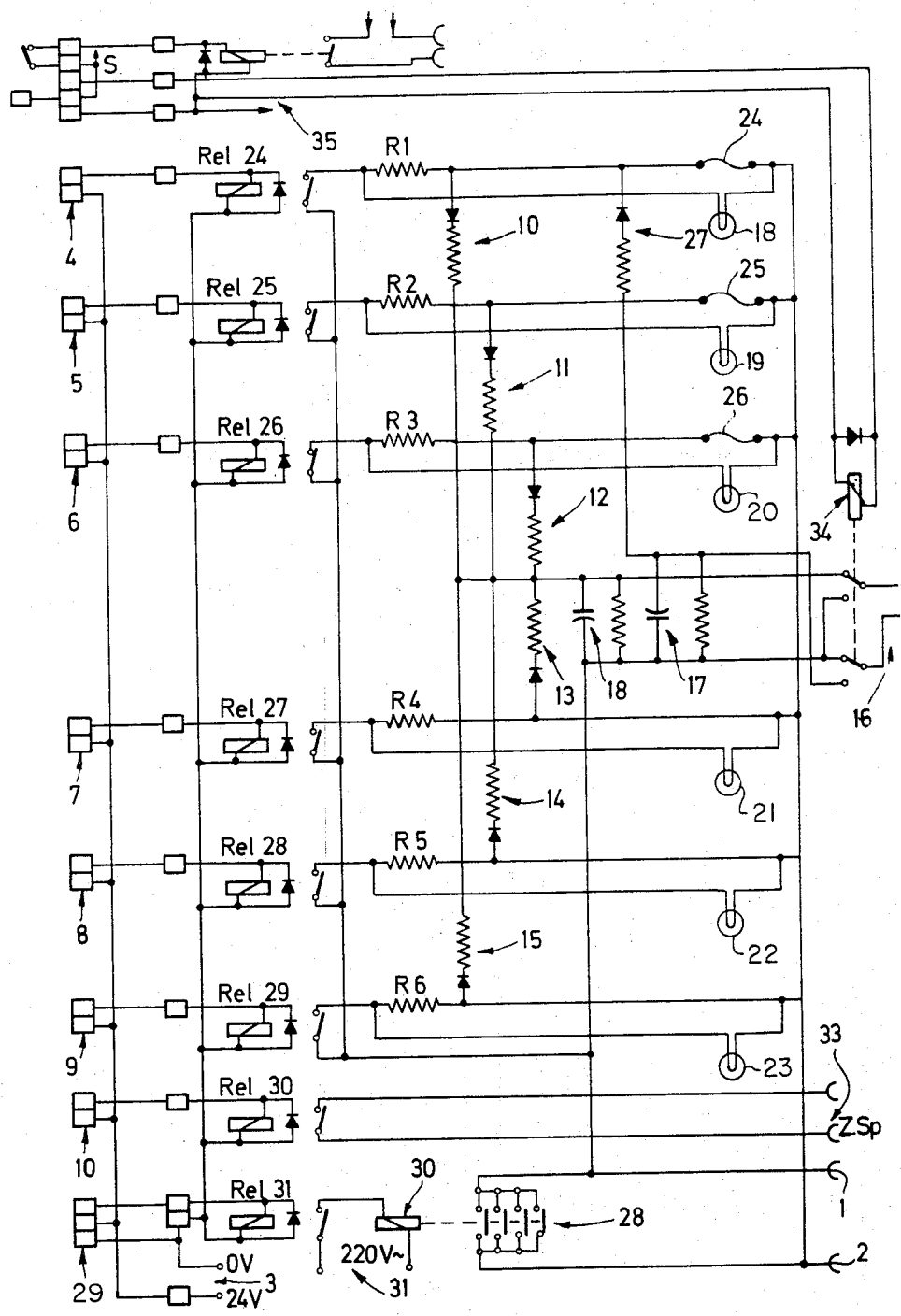

BATTERY ADAPTER

BACKGROUND OF THE INVENTION

The invention concerns a battery adaptor for use, especially in a computer-supported installation, for the direct checking out of a vehicle electrical system in the manufacture of motor vehicles.

The checking out of a vehicle electrical system is a multilevel quality assurance operation, which, by contrast with the spot check carried out in customer service workshops by means of so-called diagnostic devices, constituting a genuine examination and functional check of all electrical appliances in a motor vehicle for correct connections and correct operation. As a rule, tolerances between the actual value to be measured and a desired ideal value are specified for this inspection so that the examination, apart from any visual checks built into it, reduces purely to a comparison of actual and desired values. In this comparison, the different conditions of measurement in the individual appliances must be postulated, for it is clear that the checking, for example, of the sidelights, dimmed lights and headlights must be carried out differently from the checking of the windshield wiper motor or the ventilating fan motor.

SUMMARY OF THE INVENTION

The present invention thus embraces a battery adaptor of the type mentioned earlier in that it consists of at least one measuring resistor which can be switched into the appliance circuit tapped off the motor car battery, the measuring resistor being provided with terminals for an analogue/digital converter, namely, preferably an electronic voltmeter, connected to a computer.

The invention thus proceeds from the reasoning that all the electrical appliances of a motor vehicle are necessarily supplied by the vehicle battery, which, as a rule, is easily accessible. The feeder lines to the appliances are mostly led to a distribution busbar which is connected to the poles of the battery by its pole cables. If now, after disconnecting one pole cable, the measuring resistor of the battery adaptor in accordance with the invention is clamped by means of a first terminal clamp to this released battery pole and the pole cable is connected to a second terminal clamp of the measuring resistor, then an extremely simple measuring facility is provided thereby for the individual appliance, because it is easily seen that the entire current to a connected appliance now flows through this measuring resistor so that a voltage can be tapped off across the resistor which is fed to the computer by the analogue/digital converter connected across the measuring resistor for a comparison of the real and the desired values to be carried out by the computer.

Although, in principle, it appears possible to provide the battery adaptor with a single measuring resistor only, a plurality of measuring resistors interconnected into a network is preferably provided, correlated with a group of appliances wherein approximately equal conditions of measurement prevail. Thus, for example, a first measuring resistor may be allocated to the checking of the sidelight, the brake light and the wiper motor installation, while a second measuring resistor is allocated to the checking of the dimmed lights and headlights as well as the warning light, and a third measuring resistor is allocated to the checking of the traffic indicators and the cigarette lighter. If several measuring resistors are provided then these should preferably be capable of being connected into the appliance circuit tapped off the vehicle battery under computer control by a suitable switching element, such as, for example, a switching relay or similar device.

A diode-resistor combination is provided for the network of several measuring resistors of a battery adaptor according to the invention as a coupling element of each measuring resistor in the connecting line to the analogue/digital converter. In front of the converter input, an RC link should be connected as an interference filter. It will furthermore be useful to connect a signal device in parallel with each measuring resistor, by which a possible failure of the particular measuring resistor is indicated visually or aurally.

In this context, it seems appropriate to describe briefly the working principle of the computer-controlled installation which should preferably be used in association with the battery adaptor in accordance with the invention. In this installation, which is not the subject of the present application, a computer is provided, which has been supplied with the desired values of all possible electrical appliances in a motor vehicle. The analogue/digital converter, connected to the measuring resistors which are linked into a network, is connected to this computer by an input/output device. A print-out recorder, as, for example, a typewriter with programmed paper feed, is also connected to this input/output device of the computer. Every error recognized by the computer arising out of the comparisons of the actual and desired values performed by the computer can be printed out by the recorder. Moreover, a punched card reader can be connected to the input/output device of the computer. According to the checking instructions read from the punched card, the reader controls by means of the individual switching elements the connection of the individual measuring resistors into the circuit. Finally, a display device can also be connected to the input/output device. The individual checking instructions of an inspection sequence can be read on the display device, one by one.

Thus, when the battery adaptor according to the invention, together with its measuring resistors, is connected in the circuit, in the manner described above, between the appliances and the vehicle battery, each electrical appliance can be inspected according to a specified checking sequence. To do so, the computer first initiates the connector of one of the measuring resistors into the input of the connected analogue/digital converter, which is then ready for a voltage measurement of the appliance, to which the measuring resistor so connected is allocated. When the appliance is switched on, its current flows by means of the measuring resistor in the circuit, and the analogue/digital converter connected to the resistor performs the voltage measurement across it. This voltage is then fed into the computer as the actual value for comparison with the desired value stored in the computer.

Numerous additional objects and advantages of the invention are apparent in the detailed description which follows. The points of novelty which characterize the invention are pointed out in the claims annexed to and forming a part of this specification.

BRIEF DESCRIPTION OF THE DRAWING

The drawing is a schematic diagram of a battery adaptor designed in accordance with the present invention.

DESCRIPTION OF THE PREFERRED EMBODIMENT

The battery adaptor according to the invention is explained below in greater detail regarding these and further distinguishing features with the help of its wiring diagram shown in the attached drawing.

For the particular embodiment to be described here of the battery adaptor according to the invention, it is assumed that altogether six measuring resistors R1 to R6 are provided, linked into a network, which, via the terminal clamps 1 and 2, can be connected into the circuit between the vehicle battery and the electrical appliances of a motor vehicle. A switching relay, Rel. 24 to Rel. 29, is correlated with each of the measuring resistors. The switching relays are supplied by a 24 V voltage source 3 and are connected to the computer by the connectors 4 to 9, so that, according to the individual checking instructions of a specified checking sequence, the computer can switch one of the measuring resistors R1 to R6 into the circuit of the particular appliance to which this measuring resistor has been allocated.

Each of the measuring resistors R1 to R6 is connected by a diode-resistor combination 10 to 15 to the input 16 of an analogue/digital converter connected to the computer. The converter is to be regarded as an electronic voltmeter. Two RC-links 17 and 18 are connected as interference filters ahead of the input 16 of the analogue/digital converter in relation to the measuring resistors R1 and R2 to R6, respectively. A lamp 18 to 23 is connected in parallel with each of the measuring resistors for the visual indication facility of a possible failure of the corresponding measuring resistor. The measuring resistors R1 to R3 are, in addition, protected by fuses 24 to 26, and the connection between the RC-link 17 and the measuring resistor R1 contains another diode-resistor combination 27.

28 denotes a short circuit fuse which can short-circuit the battery current if the computer, when carrying out a comparison of actual and desired values for a particular appliance, discovers an excess of the actual over the desired values so large that damage to the corresponding measuring resistor may occur. If so, the computer causes the energizing of one switching relay Rel. 31, via a connector 29. The switching relay is also supplied by the 24V voltage source 3. The energized switching relay, relay 31, switches a relay 30 into the circuit of the 220 V voltage source 31 connected to this relay so that this relay 30 is energized and thus actuates the short circuit protection 28.

Starting from the fact that some of the electrical appliances to be inspected depend upon the switching-on of the ignition and, since it is known in current practice of motor car electrical appliance inspection that, when the ignition is switched on, there is a chance of about 40 percent that the ignition coil will lie in the circuit of these appliances, the battery adaptor according to the invention is provided with an additional device which, when the ignition is switched on, permits by-passing the ignition coil so as to prevent the falsification of the measurement of such, usually very small, appliances, This arrangement consists of a further switching relay Rel. 30, which is connected to the computer by a connector 10 and which permits the connection of a circuit connected at 33 with the primary circuit of the ignition coil. If, for example, the measuring resistor R1 is allocated to the measurement of a very small electrical appliance with switched-on ignition, then the computer controls simultaneously the switching of this measuring resistor R1 into the circuit and the by-passing of the ignition coil circuit by energizing simultaneously both relays Rel. 24 and Rel. 30.

Finally the battery adaptor, preferably designed as a computer insert, is also equipped with a switching relay 34, which is connected ahead of the input 16 of the analogue/digital converter and which is linked with a device 35 in the computer. With energized relay 34, the device 35 records the effective battery voltage measured by the analogue/digital converter and takes this voltage into account in each comparison of the actual and desired values.

While a preferred embodiment of the invention has been shown, it is to be understood that numerous modifications and changes will occur to those skilled in the art. The appended claims are intended to encompass all such modifications and changes as come within the true spirit and scope of the invention.

What is claimed as new and desired to be secured by Letters Patent of the United States is:

1. A battery adapter for use in testing out a vehicle electrical system in conjunction with a computer, said adapter comprising:

a pair of clamps one of which is suitable for connection to the terminal of a vehicle battery and the other of which is suitable for connection to a vehicle battery cable;

a plurality of different-valued measuring resistors each having first and second terminals and each having an ohmic value that is selected to be suitable for use in measuring the battery current that flows to a given set of one or more electrical appliances in a motor vehicle;

connecting means attached to said measuring resistors and to said clamps for electrically connecting said clamps to the terminals of any desired one of said resistors under the control of signals generated by said computer;

an analog-to-digital converter having a pair of analog input terminals and having a digital signal output for generating a digital signal at its output representing the magnitude of an analog potential developed across its input terminals; and means for electrically connecting the analog input terminals of said converter to the respective terminals of any measuring resistor that is electrically connected to said clamps by said connecting means.

2. A battery adapter in accordance with claim 1 wherein said connecting means comprise a plurality of relays, one corresponding to each of said measuring resistors, each having contacts arranged to electrically connect the terminals of the corresponding measuring resistors to said clamps when energized, and each having an energizing winding which can be selectively energized by the computer.

3. A battery adapter in accordance with claim 1 wherein the means for electrically connecting comprise a first circuit path connecting one of said analog input terminals to one of said clamps and a second circuit path connecting the other of said analog input terminals to the other of said clamps.

4. A battery adapter in accordance with claim 3 wherein one of said circuit paths includes resistance and which further includes a capacitor connected in parallel with said analog input terminals.

5. A battery adapter in accordance with claim 3 wherein at least one of said first and second circuit paths includes a diode which prevents reverse potentials from reaching said analog-to-digital converter.

6. A battery adapter in accordance with claim 3 which includes a relay, and wherein the contacts of said relay connect said analog input terminals to said first and second circuit paths, and wherein the contacts of said relay reverse the connection of said input terminals to said circuit paths when said relay is actuated, and wherein said relay includes an energizing winding which can be selectively energized by the computer.

7. A battery adapter in accordance with claim 1 which includes neams controlled by said computer for electrically short-circuiting together said pair of clamps wherever necessary to protect said measuring resistors from excessively high currents.

8. A battery adapter in accordance with claim 1 wherein fuses are connected in series with at least some of said measuring resistors to protect the resistors from excessively high currents.

9. A battery adapter in accordance with claim 1 wherein signalling means are connected in parallel with the measuring resistors for signalling when one of said resistors is open-circuited.

10. A battery adapter in accordance with claim 1 to which is added means connecting to a vehicle ignition coil primary circuit for bypassing the ignition coil under the selective control of said computer to facilitate the measurement of small battery currents.

* * * * *